United States Patent
Matsushima et al.

(10) Patent No.: US 6,813,419 B2
(45) Date of Patent: Nov. 2, 2004

(54) OPTICAL TRANSMISSION MODULE AND OPTICAL COMMUNICATION SYSTEM USING THE SAME

(75) Inventors: Naoki Matsushima, Yokohama (JP); Kazumi Kawamoto, Yokohama (JP); Hideo Sotokawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 09/793,901

(22) Filed: Feb. 28, 2001

(65) Prior Publication Data

US 2002/0054738 A1 May 9, 2002

(30) Foreign Application Priority Data

Sep. 28, 2000 (JP) ........................................ 2000-300556

(51) Int. Cl.[7] ............................. G02B 6/26; G02B 6/10; G02B 6/14; G02B 6/42
(52) U.S. Cl. .............................. 385/50; 385/27; 385/28; 385/33; 385/124; 385/129; 385/49
(58) Field of Search .............................. 385/27–29, 39, 385/129–132, 124, 33, 34, 43, 146–147, 126, 49–50, 72, 14; 372/7, 45

(56) References Cited

U.S. PATENT DOCUMENTS

| | | | |
|---|---|---|---|
| 4,637,681 A | | 1/1987 | Yamamoto et al. |
| 4,701,011 A | * | 10/1987 | Emkey et al. ................. 385/34 |
| 4,759,595 A | | 7/1988 | Boord et al. |
| 4,919,504 A | * | 4/1990 | Colas et al. ................. 385/130 |
| 4,929,065 A | | 5/1990 | Hagerty et al. |
| 5,035,477 A | * | 7/1991 | Schlump ........................ 385/38 |
| 5,218,654 A | * | 6/1993 | Sauter ........................... 385/24 |
| 5,381,503 A | * | 1/1995 | Kanamori et al. ........... 385/123 |
| 5,613,028 A | * | 3/1997 | Antos et al. ................. 385/123 |
| 5,838,852 A | | 11/1998 | Ko |
| 5,894,537 A | * | 4/1999 | Berkey et al. ............... 385/123 |
| 5,909,529 A | | 6/1999 | Bhagavatula |
| 6,324,326 B1 | * | 11/2001 | Dejneka et al. ............. 385/123 |
| 6,377,740 B1 | * | 4/2002 | Onishi et al. ................ 385/123 |
| 6,501,891 B2 | * | 12/2002 | Kawamoto et al. .......... 385/123 |
| 2002/0094166 A1 | * | 7/2002 | Weerden et al. .............. 385/39 |

FOREIGN PATENT DOCUMENTS

| | | |
|---|---|---|
| JP | 61-206904 | 12/1986 |
| JP | 9-288287 | 11/1997 |

OTHER PUBLICATIONS

"Numerical Analysis of Eigenmodes and Splice Losses of Thermally Diffused Expanded Core Fibers", Y. Ohtera, et al, Journal of Lightwave Technology, vol. 17, No. 12, Dec. 1999, pp. 2675–2682.

"Optical Multi–Mode Interference Devices Based on Self–Imaging: Principles and Applications", L. Soldano et al, 8217 Journal of Lightwave Technology 13 (1995) Apr., No. 4, New York, NY, US, pp. 615–627.

(List continued on next page.)

Primary Examiner—Edward J. Glick
Assistant Examiner—Krystyna Suchecki
(74) Attorney, Agent, or Firm—Antonelli, Terry, Stout & Kraus, LLP (57) ABSTRACT

An optical transmission module includes a beam spot size expanding waveguide and a beam spot size reducing waveguide adjoining in the light propagating direction, or includes a beam spot size expanding waveguide, a beam spot size retaining waveguide and a beam spot size reducing waveguide aligning in the light propagating direction. Each waveguide has laminated core layers which are formed of materials of different refractive indexes.

21 Claims, 5 Drawing Sheets

OTHER PUBLICATIONS

"Adiabatically Tapered Periodic Segmentation of Channel Waveguides for Mode–Size Transformation and Fundamental Mode Excitation", M. Chou, et al, Optics Letters, vol. 21, No. 11, Jun. 1, 1996, pp. 794–796.

"Polarisation Insensitive Arrayed–Waveguide Grating Multiplexers with Ion–Exchanged Waveguides in Glass", B. Buchold, et al, Electronics Letters, Nov. 21, 1996, vol. 32, No. 24.

"Ray Analysis of Parabolic–Index Segmented Planar Waveguides", V. Rastogi, et al, Jul. 20, 1998, vol. 37, No. 21, Applied Optics, pp. 4851–4856.

"A Very Short Planar Silica Spot–Size Converter Using a Nonperiodic Segmented Waveguide", M. Spuhler et al, Journal of Lightwave Technology, vol. 16, No. 9, Sep. 1998, pp. 1680–1685.

* cited by examiner

OPTICAL TRANSMISSION MODULE AND OPTICAL COMMUNICATION SYSTEM USING THE SAME

BACKGROUND OF THE INVENTION

The present invention relates primarily to an optical transmission module used for an optical transmission system or optical conversion system (these systems will be called commonly optical communication systems), and also relates to the technique of optical coupling between a light emitting or receiving device and an optical fiber, between a light emitting or receiving device and an optical circuit and between an optical circuit and an optical fiber in an optical transmission module.

In the progressive evolution of information transmission paths based on the optical scheme, information transmission through optical fiber cables is becoming prevalent not only among industrial buildings, but also among apartment buildings and individual houses. One of the crucial affairs to be treated at present is obviously the price reduction of the optical transmission system, particularly the price reduction of the optical transmission module which is connected to the communication apparatus of each subscriber.

It has been a common design for the optical coupling between an optical device, such as a semiconductor laser source, and an optical fiber cable or optical waveguide to place an optical lens between these parts so as to enhance their optical coupling efficiency. However, the scheme of placing a lens between the optical device and the optical waveguide not only results in an increased number of component parts, but it compels the worker to make alignment of these separate parts. This extremely delicate work has been a major barrier to the price reduction of the optical transmission module which is installed on the part of the subscriber.

As a scheme of overcoming this problem, there has been devised a semiconductor laser source integrated with a beam spot size converter as described, for example, in Japanese Patent Unexamined Publication No.hei-5-249331, Japanese Patent Unexamined Publication No.2000-214340, and the device has been developed in recent years so as to be put into practice.

Figure 10:
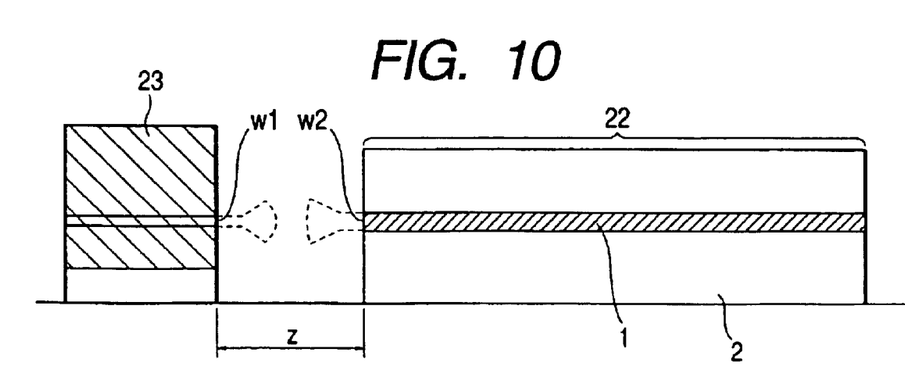
FIG. 10 is a schematic diagram showing the optical coupling based on the prior art.

First, the beam spot size converter will be explained with reference to FIG. 10. The figure shows schematically an optical coupling system between a semiconductor laser source and an optical waveguide, and is also used to explain the evaluation of the light beam coupling efficiency.

The light beam is assumed here to be a Gaussian beam, and the coupling of Gaussian beams of the 0-th order will be dealt here, since the light beam used in the optical communication has a single guided mode in most cases. For beam spot sizes W1 and W2 of a semiconductor laser source 23 and optical waveguide 22, respectively, (the beam spot size is the radius of beam spot at which the amplitude of Gaussian beam falls to 1/e of the center value) at the respective beam waists (the beam waist is the position of beam axis where the curvature of the Gaussian beam wave surface is infinity), a distance Z between the beam waists, a beam deviation (mis-alignment) X in the direction which is vertical from the optical axis, and a light beam wavelength $\lambda$, the coupling efficiency $\eta$ is expressed by the following formula.

$$\eta = \kappa \exp\left\{-\kappa \frac{x^2}{2}\left(\frac{1}{w_1^2} + \frac{1}{w_2^2}\right)\right\} \quad (1)$$

where $\kappa$ is given as:

$$\kappa = \frac{4}{\left(\frac{w_1}{w_2} + \frac{w_2}{w_1}\right)^2 + \left(\frac{\lambda z}{\pi w_1 w_2}\right)^2} \quad (2)$$

The above formulas reveal that the coupling efficiency and the tolerance against the beam mis-alignment are improved by: (1) making W1=W2, and (2) making this value as large as possible.

The conventional semiconductor laser source 23 has a very small beam spot size W1, i.e., incident beam spot size W1, as compared with the beam spot size W2 of the optical fiber or optical waveguide 22, and therefore the condition W1=W2 is not met and thus the coupling efficiency is not good enough.

A semiconductor laser source initegrated with a beam spot size converter is intended to increase the beam spot size W1 close to W2, thereby improving the coupling efficiency and tolerance in consequence.

SUMMARY OF THE INVENTION

A laser source integrated with a beam spot size converter is manufactured based on the selective crystal growing process so as to make a tapered film thickness at the emission port of the core section. The integrated structure of the beam spot size converter influences the optimal design of the laser source itself, and it also causes the machining error to be highly influential on the laser characteristics. On this account, this laser source suffers a poor yield as compared with the conventional laser source, and consequently the costly laser source does not contribute to the price reduction of the optical transmission module.

There is a limit in the expansion of beam spot size achieved by the tapered film structure based on the selective crystal growing process, and the beam spot size attainable at present is around 10 degrees in terms of the divergence angle of far field pattern for a light beam approximated to be a Gaussian beam. There is still a significant difference of it from about 5 degrees of the divergence angle of the optical fiber. Therefore, for increasing the coupling efficiency and facilitating the parts assembly, even in the case of using a laser source with a beam spot size converter, it is necessary to develop a new optical coupling technique to be applied to the laser source.

Although the conventional technique of placing an optical lens between the semiconductor laser source and the optical waveguide is a conceivable scheme, increased component parts and intricate assembling work resulting from the adoption of this scheme precludes the accomplishment of cost reduction of the optical transmission module.

Accordingly, a first object of the present invention is to provide an optical transmission module and an optical communication system which have the improved coupling efficiency between the optical component parts.

A second object of the present invention is to provide an optical transmission module and an optical communication system which have at least one of the improved coupling efficiency between the optical component parts or the improved tolerance.

In order to achieve the first objective, the inventive optical transmission module includes a first optical waveguide which expands the spot size of a light beam along the light propagating direction and a second optical waveguide which reduces the beam spot size, which has been expanded by the first optical waveguide, along the light propagating direction, with at least one of the first and second optical waveguides having its refractive index of its core section varied along the x axis which intersects the z axis of the light propagating direction vertically on a plane perpendicular to the z axis or along the y axis which intersects the z axis horizontally on the plane.

The waveguide core section is formed of a first material having refractive index $n_1$ in its central portion and a second material having refractive index $n_2$ which is smaller than $n_1$ in its portions on the upper and lower sides or on the right and left sides of the portion of the first material.

The waveguide core section is formed by sequential lamination of a first core having refractive index $n_1$,., an (n−1)th core having refractive index $n_{n-1}$, and an n-th core having refractive index $n_n$, with these cores having a relation in terms of their values of refractive index of: $n_{(n+1)/2} > n_{(n-1)/2} > \ldots > n_2 > n_1$ and $n_{(n+1)/2} > n_{(n+3)/2} > \ldots > n_{n-1} > n_n$.

A number of cores are aligned in the z-axis direction to form the core section.

The cores have their widths in one of the x-axis or y-axis direction varied in the z-axis direction.

In order to achieve the second objective, the inventive optical transmission module includes a first optical waveguide which expands the spot size of a light beam along the light propagating direction, a second optical waveguide which retains the beam spot size which has been expanded by the first waveguide, and a third optical waveguide which reduces the beam spot size which has been retained by the second waveguide, with at least one of the first, second and third waveguides having its refractive index of its core section varied along the x axis which intersects the z axis of the light propagating direction vertically on a plane perpendicular to the z axis or along the y axis which intersects the z axis horizontally on the plane.

The waveguide core section is formed of a first material having refractive index $n_1$ in its central portion and a second material having refractive index $n_2$ which is smaller than $n_1$ in its portions on the upper and lower sides or on the right and left sides of the portion of the first material.

The waveguide core section is formed by sequential lamination of a first core having refractive index $n_1, \ldots$, an (n−1)th core having refractive index $n_{n-1}$, and an n-th core having refractive index $n_n$, with these cores having a relation in terms of their values of refractive index of: $n_{(n+1)/2} > n_{(n-1)/2} > \ldots > n_2 > n_1$ and $n_{(n+1)/2} > n_{(n+3)/2} > \ldots n_{n-1} > n_n$.

A number of cores are aligned in the z-axis direction to form the core section.

At least one core of the core section has a cross-sectional shape on the y-z plane of a circle, ellipse, approximate circle or appropriate ellipse.

The cores have their widths in one of the x-axis or y-axis direction varied in the z-axis direction.

In the foregoing structure of the optical transmission module, clad layers, which are lower in refractive index than the cores, are formed in spaces between cores aligning in the z-axis direction.

DESCRIPTION OF THE PREFERRED EMBODIMENTS

Initially, the principle of the inventive optical transmission module will be explained with reference to FIGS. 8A and 8B. In the figures, reference numeral 23 denotes a light emitting device such as a semiconductor laser source, 21 is a beam spot size converting waveguide which propagates a light beam while expanding and thereafter reducing, or expanding, retaining and thereafter reducing the beam spot size, and 22 is an optical waveguide which propagates the light beam which has been converted in spot size by the waveguide 21.

Figure 8A:
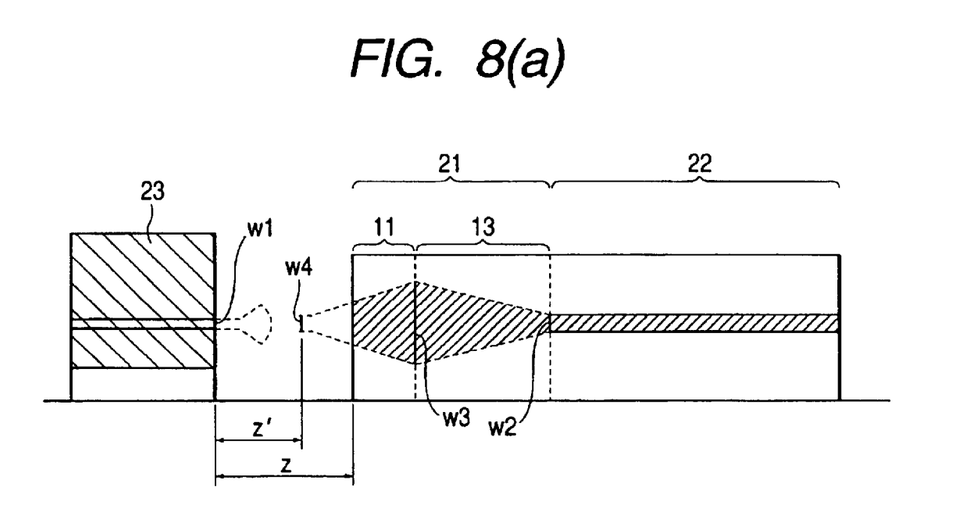
FIGS. 8A and 8B are diagrams showing schematically the variation of beam spot size of the inventive beam spot converting waveguide.

The beam spot size converting waveguide 21 shown in FIG. 8A is an example in which it is made up of a beam spot size expanding waveguide 11 which propagates the light beam while expanding its spot size, and a beam spot size reducing waveguide 13 which propagates the light beam while reducing its spot size. The light beam emitted by a light emitting device 23, such as a semiconductor laser source has its beam spot size expanded by the beam spot size expanding waveguide 11. Subsequently, the light beam has its spot size reduced by the beam spot size reducing waveguide 13, and is thereafter incident to the following optical waveguide.

Figure 8B:
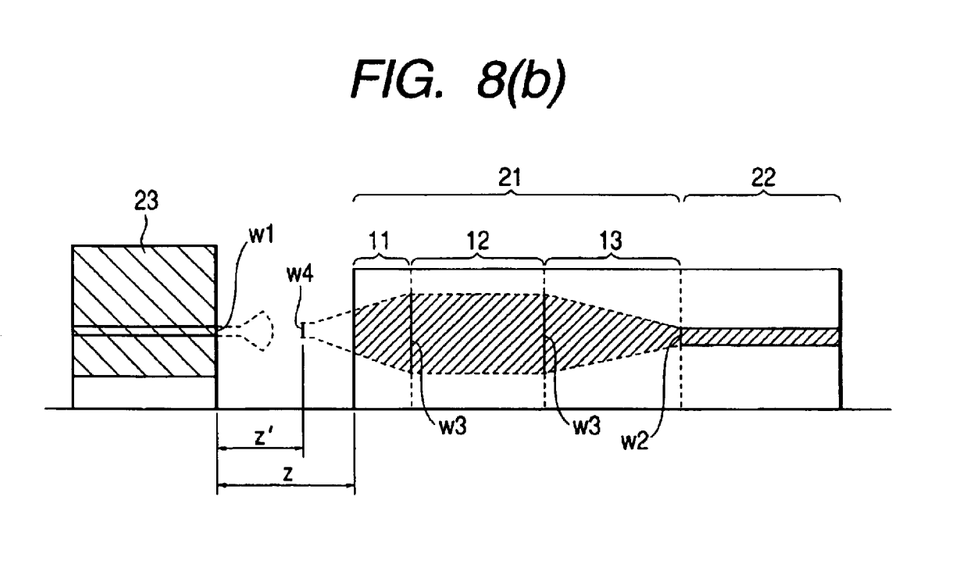

Another beam spot size converting waveguide 21 shown in FIG. 8B is an example in which it is made up of a beam spot size expanding waveguide 11 which propagates the light beam while expanding its spot size, a beam spot size retaining waveguide 12 which propagates the light beam while virtually retaining its spot size, and a beam spot size reducing waveguide 13 which propagates the light beam while reducing its spot size. The light beam having its beam spot size expanded by the beam spot size expanding waveguide 11 is virtually retained in its spot size in the beam spot size retaining waveguide 12 and reduced in its spot size in the beam spot size reducing waveguide 13, and is incident to the following optical waveguide.

The following deals with the case of light beam incident in the opposite direction from the optical waveguide 22 (the coupling efficiency is constant irrespective of the incident direction based on the raw of reciprocity).

In the optical module shown in FIG. 8A, the light beam coming through the optical waveguide 22 into the beam spot size converting waveguide 21 and having beam spot size W2 at the entry of the beam spot size reducing waveguide 13 has its spot size expanded to W3 at the border between the beam spot size reducing waveguide 13 and the beam spot size expanding waveguide 11 by being propagated in the optical waveguide 13. The light beam is further propagated by the beam spot size expanding waveguide 11 while reducing the spot size, and it forms a beam waist having beam spot size W4 at position z=Z'.

Namely, providing the beam spot size converting waveguide 21 enables the conversion of spot size W2 of the light beam coming in from the optical waveguide 22 into an arbitrary spot size W4. Accordingly, even in case spot size W2 is greater than W1 inevitably due to the characteristics of the semiconductor laser source 23 or optical waveguide 22, it becomes possible by the provision of the beam spot size converting waveguide 21 to convert the spot size W2 into the spot size W4 which is virtually equal to the spot size W1, and consequently the light beam coupling efficiency can be improved. This fact is also suggested by the formulas (1) and (2) described previously.

In addition, providing the beam spot size converting waveguide 21 enables the position of beam waist W4 to shift practically close to the semiconductor laser source 23, thereby reducing the distance Z' as compared with the prior art waveguide, and consequently the light beam coupling efficiency can further be improved. Particularly, using the beam spot size converting waveguide 21 enables the position of beam waist W4 to shift practically close to the semiconductor laser source 23 beyond the physical limit of assembly of the semiconductor laser source 23 and optical waveguide 22.

Similarly, in the optical module shown in FIG. 8B, the light beam coming through the optical waveguide 22 into the beam spot size converting waveguide 21 and having spot size W2 at the entry of the beam spot size reducing waveguide 13 has its spot size expanded to W3 at the border between the beam spot size reducing waveguide 13 and the beam spot size retaining waveguide 12 by being propagated in the optical waveguide 13, has its spot size retained during the propagation in the beam spot size reducing waveguide 13, and is incident with the spot size W3 at the border to the beam spot size expanding waveguide 11. The light beam is further propagated by the beam spot size expanding waveguide 11 while reducing the spot size, and it forms a beam waist having beam spot size W4 at position z=Z'.

Namely, providing the beam spot size converting waveguide 21 enables the conversion of spot size W2 of the light beam coming in from the optical waveguide 22 into an arbitrary spot size W4, as in the case of the arrangement of FIG. 8A. Accordingly, even in case the spot size W2 is greater than the spot size W1 inevitably due to the characteristics of the semiconductor laser source 23 or optical waveguide 22, it becomes possible by the provision of the beam spot size converting waveguide 21 to convert the spot size W2 into the spot size W4 which is virtually equal to the spot size W1, and consequently the light beam coupling efficiency can be improved.

The coupling efficiency between the semiconductor laser source 23 and the optical waveguide 22 is determined from the beam spot sizes W1 and W4 at the respective beam waists and their distance Z'. Accordingly, by building an optical transmission module by use of the beam spot size converting waveguide 21 so that the beam spot size W2 becomes the W4 which is virtually equal to the W1, the coupling efficiency is improved.

It should be noted that the beam spot size converting waveguide 21 can be fabricated together with the optical waveguide 22 to have a unitary structure, and accordingly these waveguides 21 and 22 do not create a positioning error, do not cause the increase of component parts and do not necessitate an intricate assembling work.

There can be a case depending on the value of beam spot size W1 of the semiconductor laser source 23, in which the coupling efficiency in the absence of axial mis-alignment improves, while the tolerance against the axial mis-alignment deteriorates. In this respect, by employing the structure with the beam spot size retaining waveguide 12 as shown in FIG. 8B, it becomes possible to improve both the coupling efficiency and tolerance, or improve one of the coupling efficiency or tolerance and retain the other.

The principle of this affair will be explained with reference to FIGS. 9A and 9B.

Figure 9A:
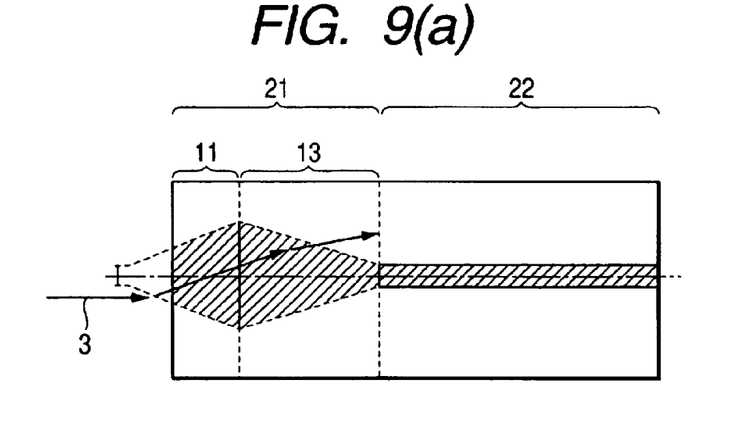
FIGS. 9A and 9B are diagrams showing schematically the enhancement of the tolerance of the inventive beam spot size retaining waveguide.

First, in case a light beam 3 emitted by the semiconductor laser source has a beam deviation, i.e., axial mis-alignment, (without angular deviation) and is incident to the beam spot size converting waveguide 21 without a beam spot size retaining waveguide as shown in FIG. 9A, the light beam propagated by the waveguide 21 has an inclination relative to the optical axis, i.e., it deviates from the optical axis. As a result, the intensity of beam received by the optical waveguide 22 decreases, and thus the tolerance against the axial mis-alignment falls.

Figure 9B:
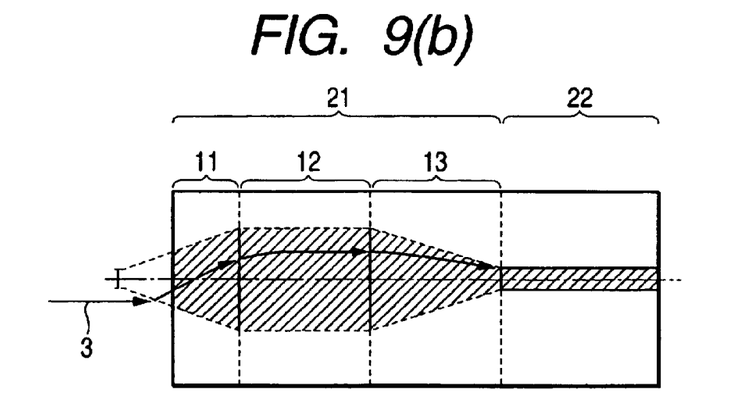

In contrast, in the presence of the beam spot size retaining waveguide 12 as shown in FIG. 9B, the light beam 3 which has been inclined by the beam spot size expanding waveguide 11 is collimated to regain the course along the optical axis by the beam spot size retaining waveguide 12. The light beam having its propagating direction corrected is thereafter treated by the beam spot size reducing waveguide 13 to have the spot size of the optical waveguide 22 and propagated to the waveguide 22. Namely, providing the beam spot size retaining waveguide 12 enables the rectification of an inclined light beam to regain the course along the optical axis. In consequence, the deterioration of coupling efficiency caused by the axial mis-alignment can be suppressed and the tolerance against the axial mis-alignment can be improved.

The enhanced tolerance against the axial mis-alignment relaxes the required positioning accuracy of the semiconductor laser source 23, i.e., the accuracy of alignment of it with the optical waveguides which include the beam spot size converting waveguide 21, facilitating the mounting of the semiconductor laser source 23.

Figure 1:
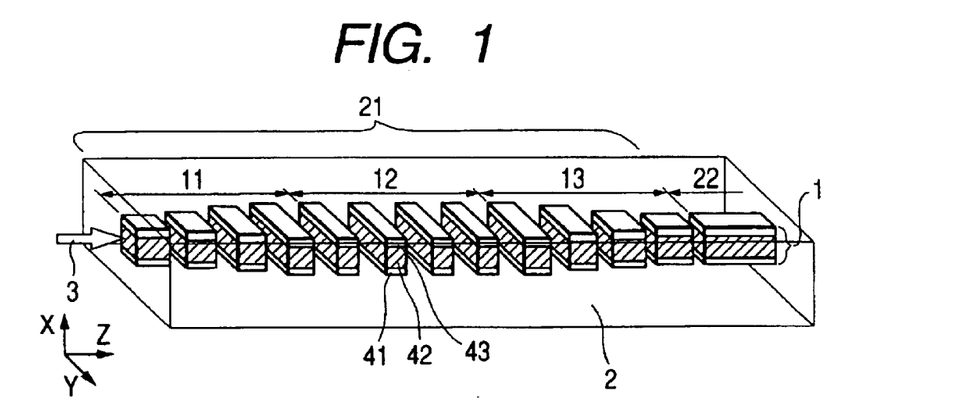
FIG. 1 is a perspective view of a beam spot converting waveguide based on a first embodiment of this invention.

FIG. 1 shows an embodiment of the arrangement of the beam spot size converting waveguide 21. The figure shows only the beam spot size converting waveguide 21 and optical waveguide 22 for the sake of simplicity. This beam spot size converting waveguide 21 is made up of a beam spot size expanding waveguide 11, beam spot size retaining waveguide 12 and beam spot size reducing waveguide 13.

Further shown in FIG. 1 are a light beam 3 which is propagated in the waveguide 21, cores 1 which propagate the light beam 3, a clad material 2 which surrounds the cores 1 and has a refractive index smaller than that of the cores 1.

Each core 1 is made up of a number of layers having different refractive indexes. Specifically, the core 1 includes a first core 41, second core 42 and third core 43 which are laminated in this order along the x axis which is perpendicular to the substrate surface. These cores 41, 42 and 43 have refractive indexes $n_1$, $n_2$ and $n_3$, respectively, which are related to be $n_2 > n_1 > n_0$ and $n_2 > n_3 > n_0$, where $n_0$ is the refractive index of the clad 2. In regard to the refractive index $n_2$ of the second core 42 located at the middle of the core and the refractive index $n_0$ of the clad 2, there is defined a value $\Delta n=(n_2-n_0)/n_2$ (%) which is preferably confined in the range of 0.2–0.5%.

In this embodiment, the first core 41 and third core 43 are made of the same material, i.e., $n_1=n_3$, which contributes to the reduction of material cost and the easiness of fabrication.

Although the core has three layers (two kinds of material) in this embodiment, any odd number n greater than 1 of lamination is possible, provided that the first core (refractive index $n_1$), second core (refractive index $n_2$), . . . , (n−1)th core (refractive index $n_{n-1}$), and n-th core (refractive index $n_n$) which are laminated in this order are related in their values of refractive index to meet: $n_{(n+1)/2}>n_{(n-1)/2}>\ldots>n_2>n_1$ and $n_{(n+1)/2}>n_{(n+3)/2}>\ldots>n_{n-1}>n_n$. The core layers are preferably symmetric in terms of their values of refractive index and dimensions seen from the core center axis for the sake of effective beam convergence.

Based on such core arrangement that the refractive index decreases as the position is more distant from the center, a beam section which is outer within the core is propagated faster, resulting favorably in the concentration of light beam to the core center. In consequence, the tolerance in the x-axis direction, or the core laminating direction, in FIG. 1 can be improved.

Furthermore, this embodiment is designed to alter the difference of refractive index between the core and the clad in the light propagating direction so that the beam spot size is expanded or reduced. Specifically, this is the difference between the average refractive index of a segment among pairs of core and clad in alternate disposition in the light propagating direction and the refractive index of the peripheral clad. In this case, if the core has a constant cross-sectional area in the light propagating direction, the smaller the refractive index difference, the weaker is the light beam convergence and the larger is the resulting beam spot size.

The concept of the segmental waveguide which is employed as means of altering the refractive index difference will be explained.

Figure 7:
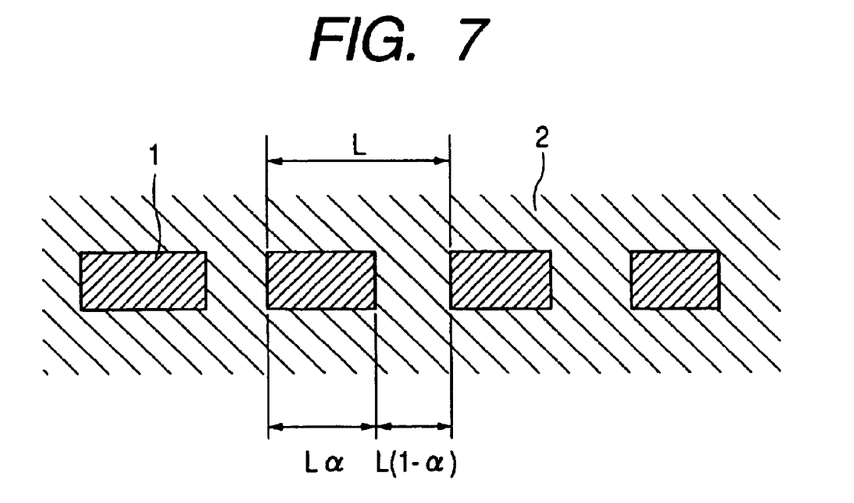
FIG. 7 is a diagram showing schematically a segmental waveguide.

FIG. 7 shows schematically a segmental waveguide. The segmental waveguide is made up of a train of multiple sets, i.e., segments, of a core 1 of a certain length and a section without core (section formed of clad 2) aligning in the light propagating direction.

For unit length L which is the sum of the lengths of the core 1 and clad section, the value of $n_1'$ which is calculated by the following formula in terms of refractive index $n_0$ of the clad 2, refractive index $n_1$ of the core 1, and proportion $\alpha$ of the core length out of the unit length L can be assumed to be the average refractive index of the waveguide across the unit length L.

$$n_1'=(1-\alpha)\cdot n_0+\alpha\cdot n_1 \quad (1)$$

This means that the refractive index of the waveguide can be changed by altering the core 1 to clad 2 ratio $\alpha$ in length along the light propagating direction, which gives the basis to the segmental waveguide as means of altering the refractive index difference.

The optical module shown in FIG. 1, which is based on the principle of this segmental waveguide, has its beam spot size expanding waveguide 11 and reducing waveguide 13 designed to increase and decrease simply the core length proportion $\alpha$ for each segment along the light propagating direction so as to change the beam spot size. Specifically, the beam spot size expanding waveguide 11 is formed of a number of segments aligning at a constant interval, with the proportion of core length out of the segment length decreasing along progressively the light propagating direction. Similarly, the beam spot size reducing waveguide 13 is formed of a number of segments having a constant length, with the proportion of core length out of the segment length increasing progressively along the light propagating direction.

The beam spot size expanding waveguide 11 can also be formed of a number of segments which are aligned at a constant spacing, with the core length being decreased progressively along the light propagating direction. Alternatively, the beam spot size expanding waveguide 11 can also be formed of a number of segments including cores of a constant length, with the segments being aligned to have their core spacing increased progressively along the light propagating direction.

The dimensions of segments, particularly of cores, which are primarily determined from the beam spot size of the semiconductor laser source, are preferably selected so that the loss of light beam during the propagation in the beam spot size converting waveguide 21 is not too large. For example, for a segment alignment interval of 20 μm, the core length is preferably selected within the range of 19–10 μm.

Furthermore, this embodiment is intended to alter the beam spot size progressively by use of a number of segments, thereby preventing the change in the mode of light beam which can possibly occur when the beam spot size is varied sharply. Preferably, the beam spot size is varied virtually at a constant rate along the light propagating direction, e.g., at a rate of 0.05–0.2% in terms of the average refractive index in a propagation distance of 100 μm.

Furthermore, this embodiment is designed to rectify the light beam which diverts in the y-axis direction during the propagation so that it is incident to the core of the next stage based on the differentiation of segment widths in the y-axis direction to such an extent that the light beam propagation mode does not change, thereby reducing the loss of light beam.

The beam spot size retaining waveguide 12 has a constant value of $\alpha$ so that the beam spot size is kept at virtually constant. If the propagation loss is a concerned matter, it is desirable for the beam spot size retaining waveguide 12 to have at its end section the same beam spot size as the beam spot size expanding waveguide 11 and reducing waveguide 13 at their end sections so as to prevent a coupling loss.

In consequence, the optical module is improved in the tolerance of y-axis direction as well as the tolerance of x-axis direction (direction of lamination) based on the principle described above and shown in FIG. 8, and it is also improved in the coupling efficiency.

For further improving the tolerance in all directions against the axial mis-alignment, it is desirable to laminate cores in a direction other than the direction in which the segment width varies.

Figure 6:
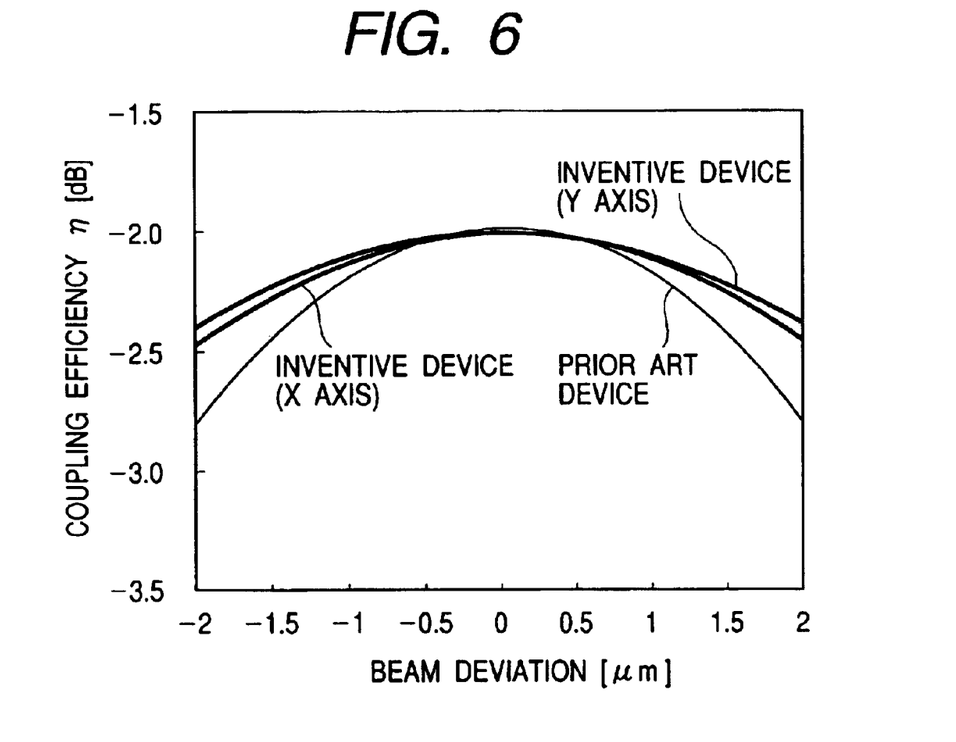
FIG. 6 is a graph showing the variation of the light beam coupling efficiency or tolerance against the beam misalignment resulting from the beam spot converting waveguide based on the first embodiment of this invention and the conventional waveguide.

FIG. 6 shows the result of calculation of the coupling efficiency based on the Beam Propagation Method (BPM) for the optical waveguide of this embodiment and the semiconductor laser source. The first core 41 and third core 43 have an equal refractive index of $n_{11}=n_{13}=1.4620$, the second core 42 has a refractive index of $n_{12}=1.4641592$, the clad has a refractive index of $n_0=1.4576$. For the orderly section of optical waveguide 22, the first core 41 and third core 43 have a 6.5-by-0.9 μm cross section, and the second core 42 has a 6.5-by-6.5 μm cross section. The graph reveals clearly that the inventive device has the larger coupling efficiency, i.e., enlarged tolerance, in both the x-axis and y-axis directions as compared with the prior art device.

The orderly section of optical waveguide 22 is formed of laminated core materials of different refractive indexes throughout its length. Therefore, in determining the refractive index and cross-sectional dimensions of each core layer, the light propagation mode in the optical waveguide 22 must be taken into account. Specifically, for example, in the case of single-mode transmission, the mode analysis must be conducted so that a large mode number does not arise.

Next, the fabrication process for forming the beam spot size converting waveguide 21 and optical waveguide 22 at once will be explained with reference to FIG. 5.

First, a silicon substrate 31 is prepared:(step (a)).

Next, a clad layer 32 is deposited on the silicon substrate 31, and a first core layer 41, second core layer 42 and third core layer 43 are formed sequentially on it to complete a core layer 33: (step (b)). The first, second and third core layers 41–43 have their dopant concentration of titanium oxide, germanium oxide, etc. adjusted so that their refractive indexes have the intended relation. The substrate 31 with the formation of the core layer 33 is placed in the electric furnace so that a film of fine glass grain is heated to a high temperature to become transparent:(step (b)). This process called flame hydrolysis deposition is a known technique for the fabrication of optical waveguide of quartz.

Subsequently, the core layer 33 including the first, second and third core layers 41–43 undergoes the formation of core patterns which will become the beam spot size converting waveguide 21 and the following optical waveguide 22 based on the ordinary photolithographic process. Specifically, for example, resist is applied to the surface, a mask pattern is transferred to it, and the core layer 33 is etched to a prescribed depth based on the RIE (Reactive Ion Etching) process:(step (c)).

Subsequently, a second clad layer 34 of fine glass grain having its dopant concentration adjusted so that the refractive index is smaller than the smallest refractive index among the core layers, i.e., the first through third core layers in this embodiment, is deposited, and heated to a high temperature to become transparent:(step (d)).

In the case of using a quartz-based material, a small amount of subordinate dopant is often added for the adjustment of the glass softening temperature and thermal expansivity. Besides a quartz-based material used for the core layer and clad, other material, e.g., polymer-based material, which propagates the light of the intended wavelength and allows the fine adjustment of refractive index may be used.

The foregoing steps of process form the beam spot size converting waveguide 21 and the following optical waveguide 22 at once. Accordingly, the beam spot size converting waveguide 21 and optical waveguide 22 have a unitary structure, which eliminates the misalignment of optical axis and is completely free from the increase of component parts and the intricate assembling work. This property is obviously common to the structures of other embodiments described in the following.

Figure 2:
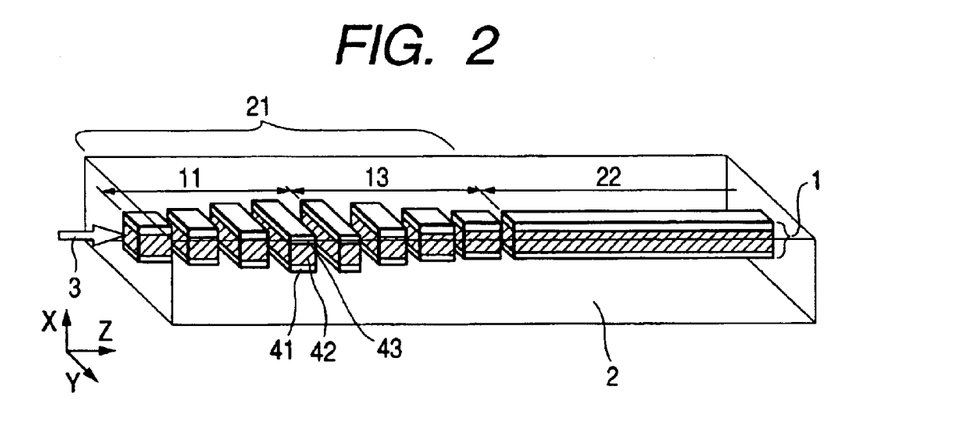
FIG. 2 is a perspective view of a beam spot converting waveguide based on a second embodiment of this invention.

Another embodiment of this invention will be explained with reference to FIG. 2.

This beam spot converting waveguide differs from the preceding first embodiment in that a beam spot size converting waveguide 21 is made up of a beam spot size expanding waveguide 11 and reducing waveguide 13. It is a segmental waveguide having laminated cores of three layers, with the proportion a of core length out of the segment length being increased and decreased simply along the light propagating direction so as to convert the beam spot size and with the segment width in the y-axis direction being varied, as in the case of the first embodiment.

This embodiment is advantageous in that it is more compact than the first embodiment due to the absence of the beam spot size retaining waveguide 12 and it can suppress the light beam propagation loss. Naturally, it is superior in coupling efficiency to the conventional waveguide.

Figure 3:
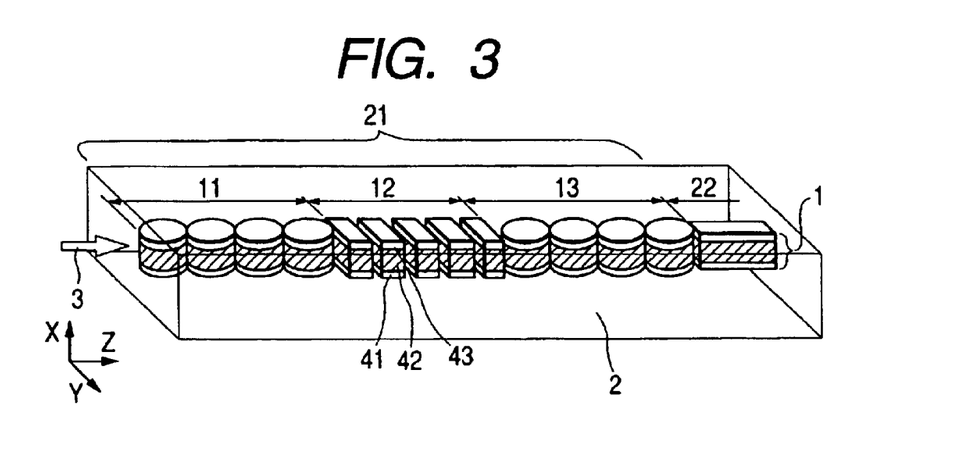
FIG. 3 is a perspective view of a beam spot converting waveguide based on a third embodiment of this invention.

Next, still another embodiment of this invention will be explained with reference to FIG. 3.

This embodiment is identical to the first embodiment in its structure made up of a beam spot size expanding waveguide 11, retaining waveguide 12 and reducing waveguide 13 having 3-layer laminated cores and in its segmental structure of the beam spot size retaining waveguide 12, but differs in that the beam spot size expanding waveguide 11 and reducing waveguide 13 have a shape of a train of circles on the y-z plane.

In contrast to the segmental waveguide in which the segments as the whole have a lens function, the beam spot converting waveguide made up of a number of cylindrical cores is functionally a series of lenses each formed of a core. The beam spot size expanding waveguide 11 expands the beam spot size based on the function of convex lens and retains the spot size to have a virtually collimated light beam. Namely, the divergence of light beam is suppressed by use of the cylindrical cores. Although FIG. 3 shows the disposition of cylindrical cores of the same diameter, the core diameter may be increased progressively along the light propagating direction to deal with the light beam of increasing beam size, and this arrangement is also desirable from the viewpoint of the reduction in length of the beam spot converter.

The beam spot size reducing waveguide 13 also has a number of cylindrical cores, which is designed to reduce the spot size of the light beam coming from the beam spot size retaining waveguide 12 based on the convex lens function so that the beam spot size becomes close to that of the optical waveguide 22. Although FIG. 3 shows the disposition of cylindrical cores of the same diameter, the core diameter may be reduced progressively along the light propagating direction to deal with the light beam of decreasing beam size.

The arrangement of this embodiment can increase the tolerance against the axial mis-alignment in any of the x-axis and y-axis directions. The beam spot size retaining waveguide 12 may be removed in case the improvement of coupling efficiency is the sole purpose.

Figure 4:
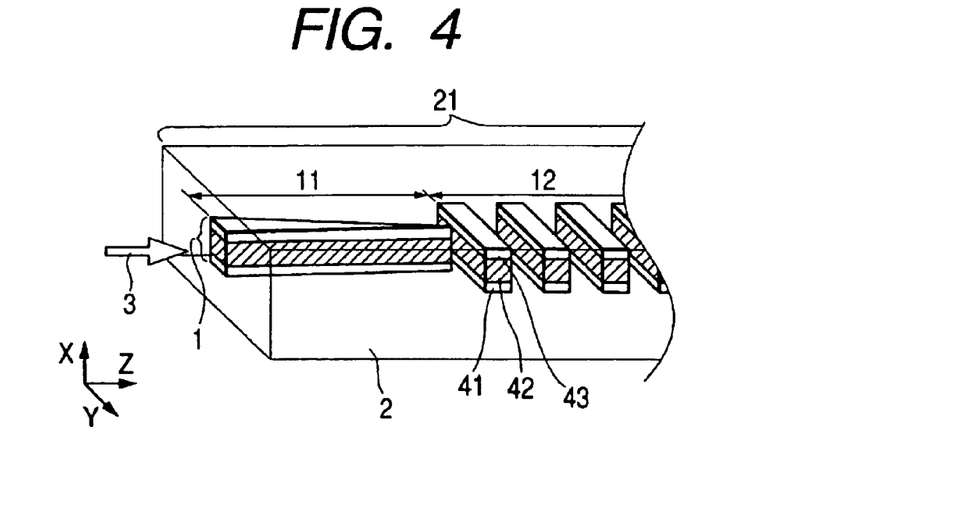
FIG. 4 is a perspective view of a beam spot converting waveguide based on a fourth embodiment of this invention.
Figure 5A:
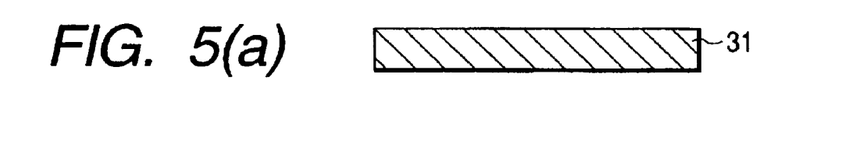
FIG. 5 is a set of cross-sectional diagrams showing the fabrication steps of the beam spot converting waveguide of the first embodiment.
Figure 5B:
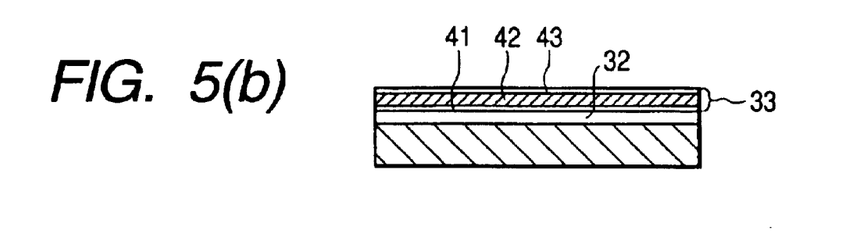
Figure 5C:
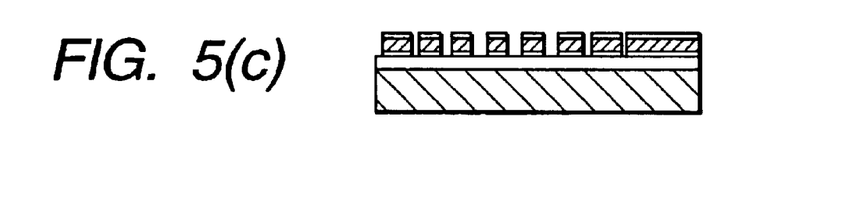
Figure 5D:
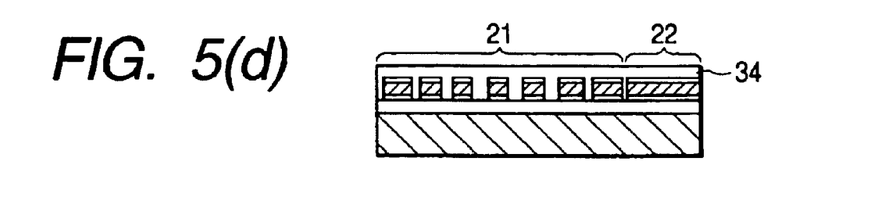

Next, still another embodiment of this invention will be explained with reference to FIG. 4.

This embodiment employs a scheme of beam spot conversion based on the variation of the cross-sectional area of a core along the light propagating direction for the beam spot size expanding waveguide 11. The beam spot converting waveguide has 3-layer laminated cores as in the cases of the preceding embodiments. This core shape can also be applied to the beam spot size converting waveguide 21 shown in FIG. 1 and FIG. 2.

The core of the beam spot size expanding waveguide 11 of this embodiment is tapered along the light propagating direction to have its dimension decreased only in its y-axis direction parallel to the substrate surface, and it has a constant dimension in the x-axis direction.

The tapered core can expand and reduce the beam spot size in both the x-axis and y-axis directions based on the fact that reduction of the core cross-sectional area along the light propagating direction reduces the beam spot size to a certain extent and further reduction of the cross-sectional area weakens the confinement of light beam in the core, causing the beam spot to expand. Accordingly, by adjusting the degree of tapering of the beam spot size expanding waveguide 11, the beam spot can be expanded to have an intended size.

The beam spot converting waveguide of this arrangement can also change the coupling efficiency, and accordingly can increase the tolerance against the axial mis-alignment in any of the x axis and y axis.

According to the present invention, it is possible to accomplish an optical transmission module and optical communication system which are improved in coupling efficiency between the optical component parts. It is possible to accomplish an optical transmission module and optical communication system which are improved in at least one of the coupling efficiency between the optical component parts or the tolerance.

What is claimed is:

1. An optical transmission module comprising a first optical waveguide which expands the spot size of a light beam along the light propagating direction and a second optical waveguide which reduces the beam spot size, which has been expanded by said first optical waveguide, along the light propagating direction, said first and second optical waveguides each having a core section, wherein at least one of said first and second optical waveguides has its refractive index of its core section varied along the x axis which intersects the z axis of the light propagating direction vertically on a plane perpendicular to the z axis or along the y axis which intersects the z axis horizontally on the plane, and wherein said core section is formed by sequential lamination of a first core of refractive index $n_1$ ..., an (n−1)th core of refractive index $n_{n-1}$ and an n-th core of refractive index $n_n$, with these cores having a relation in terms of their values of refractive index of: $n_{(n+1)/2} > n_{(n+3)/2} > ... > n_{n-1} > n_n$.

2. An optical transmission module according to claim 1, wherein said core section is formed of a plurality of cores aligning in the z-axis direction.

3. An optical transmission module according to claim 2, wherein said cores have their widths in one of the x-axis direction and y-axis direction varied along the z-axis direction.

4. An optical communication system constituted by the optical transmission module set forth in claim 1.

5. An optical transmission module comprising a first optical waveguide which expands the spot size of a light beam along the light propagating direction and a second optical waveguide which reduces the beam spot size, which has been expanded by said first optical waveguide, along the light propagating direction, said first and second optical waveguides each having a core section, wherein at least one of said first and second optical waveguides has its refractive index of its core section varied along the x axis which intersects the z axis of the light propagating direction vertically on a plane perpendicular to the z axis or along the y axis which intersects the z axis horizontally on the plane, and wherein said core section is formed of a plurality of cores aligning in the z-axis direction.

6. An optical transmission module according to claim 5, wherein said cores have their widths in one of the x-axis direction and y-axis direction varied along the z-axis direction.

7. An optical transmission module according to claim 5, wherein said cores are spaced out from each other in the z-axis direction, with clad layers having a refractive index smaller than the refractive index of said cores being formed in the spaces between adjacent cores.

8. An optical transmission module comprising a first optical waveguide which expands the spot size of a light beam along the light propagating direction and a second optical waveguide which reduces the beam spot size, which has been expanded by said first optical waveguide, along the light propagating direction, said first and second optical waveguides each having a core section, wherein at least one of said first and second optical waveguides has its refractive index of its core section varied along the x axis which intersects the z axis of the light propagating direction vertically on a plane perpendicular to the z axis or along the v axis which intersects the z axis horizontally on the plane, wherein said core section is formed of a first material having refractive index $n_1$ in its central portion and a second material having refractive index $n_2$ which is smaller than $n_1$ in its portions on the upper and lower sides or on the right and left sides of the portion of said first material, and wherein said core section is formed of a plurality of cores aligning in the z-axis direction.

9. An optical transmission module according to claim 8, wherein said cores have their widths in one of the x-axis direction and y-axis direction varied along the z-axis direction.

10. An optical transmission module comprising a first optical waveguide which expands the spot size of a light beam along the light propagating direction, a second optical waveguide which retains the beam spot size which has been expanded by said first optical waveguide, and a third optical waveguide which reduces the beam spot size which has been retained by said second optical waveguide, said first, second and third optical waveguides each having a core section, wherein at least one of said first, second and third optical waveguides has its refractive index of its core section varied along the x axis which intersects the z axis of the light propagating direction vertically on a plane perpendicular to the z axis or along the v axis which intersects the z axis horizontally on the plane and wherein said core section is formed by sequential lamination of a first core of refractive index $n_1$, ..., an (n−1)th core of refractive index $n_1$ and an n-th core of refractive index $n_n$, with these cores having a relation in terms of their values of refractive index of: $n_{(n+1)/2} > n_{(n-1)/2} > ... > n_2 > n_1$ and $n_{(n+1)/2} > n_{(n+3)/2} > ... > n_{n-1} > n_n$.

11. An optical transmission module according to claim 10, wherein said core section is formed of a plurality of cores aligning in the z-axis direction.

12. An optical transmission module according to claim 11, wherein at least one core of said core section has a cross-sectional shape on the y-z plane of a circle, ellipse, approximate circle or approximate ellipse.

13. An optical transmission module according to claim 11, wherein said cores have their widths in one of the x-axis direction and y-axis direction varied along the z-axis direction.

14. An optical communication system constituted by the optical transmission module set forth in claim 10.

15. An optical transmission module comprising a first optical waveguide which expands the spot size of a light beam along the light propagating direction, a second optical waveguide which retains the beam spot size which has been expanded by said first optical waveguide, and a third optical waveguide which reduces the beam spot size which has been retained by said second optical waveguide, said first, second and third optical waveguides each having a core section, wherein at least one of said first, second and third optical waveguides has its refractive index of its core section varied along the x axis which intersects the z axis of the light propagating direction vertically on a plane perpendicular to the z axis or along the v axis which intersects the z axis horizontally on the plane, and wherein said core section is formed of a plurality of cores aligning in the z-axis direction.

16. An optical transmission module according to claim 15, wherein at least one core of said core section has a cross-sectional shape on the y-z plane of a circle, ellipse, approximate circle or approximate ellipse.

17. An optical transmission module according to claim 15, wherein said cores have their widths in one of the x-axis direction and y-axis direction varied along the z-axis direction.

18. An optical transmission module comprising a first optical waveguide which expands the spot size of a light beam along the light propagating direction, a second optical waveguide which retains the beam spot size which has been expanded by said first optical waveguide, and a third optical waveguide which reduces the beam spot size which has been retained by said second optical waveguide, said first, second and third optical waveguides each having a core section, wherein at least one of said first, second and third optical waveguides has its refractive index of its core section varied along the x axis which intersects the z axis of the light propagating direction vertically on a plane perpendicular to the z axis or along the v axis which intersects the z axis horizontally on the plane, wherein said core section is formed of a first material having refractive index $n_1$ in its central portion and a second material having refractive index $n_2$ which is smaller than $n_1$ in its portions on the upper and lower sides or on the right and left sides of the portion of said first material, and wherein said core section is formed of a plurality of cores aligning in the z-axis direction.

19. An optical transmission module according to claim 18, wherein at least one core of said core section has a cross-sectional shape on the y-z plane of a circle, ellipse, approximate circle or approximate ellipse.

20. An optical transmission module according to claim 18, wherein said cores have their widths in one of the x-axis direction and y-axis direction varied along the z-axis direction.

21. An optical transmission module comprising a first optical waveguide which expands the spot size of a light beam along the light propagating direction, a second optical waveguide which retains the beam spot size which has been expanded by said first optical waveguide, and a third optical waveguide which reduces the beam spot size which has been retained by said second optical waveguide, said first, second and third optical waveguides each having a core section, wherein at least one of said first, second and third optical waveguides has its refractive index of its core section varied along the x axis which intersects the z axis of the light propagating direction vertically on a plane perpendicular to the z axis or along the v axis which intersects the z axis horizontally on the plane and wherein said cores are spaced out from each other in the z-axis direction, with clad layers having a refractive index smaller than the refractive index of said cores being formed in the spaces between adjacent cores.

* * * * *